METHOD OF MAKING REINFORCED PLASTIC BAGS

Original Filed March 14, 1960 2 Sheets-Sheet 1

INVENTOR.
Leonard E. Canno
BY Emery, Whittemore
Sandoe & Drehmann
ATTORNEYS

METHOD OF MAKING REINFORCED PLASTIC BAGS
Original Filed March 14, 1960 2 Sheets-Sheet 2
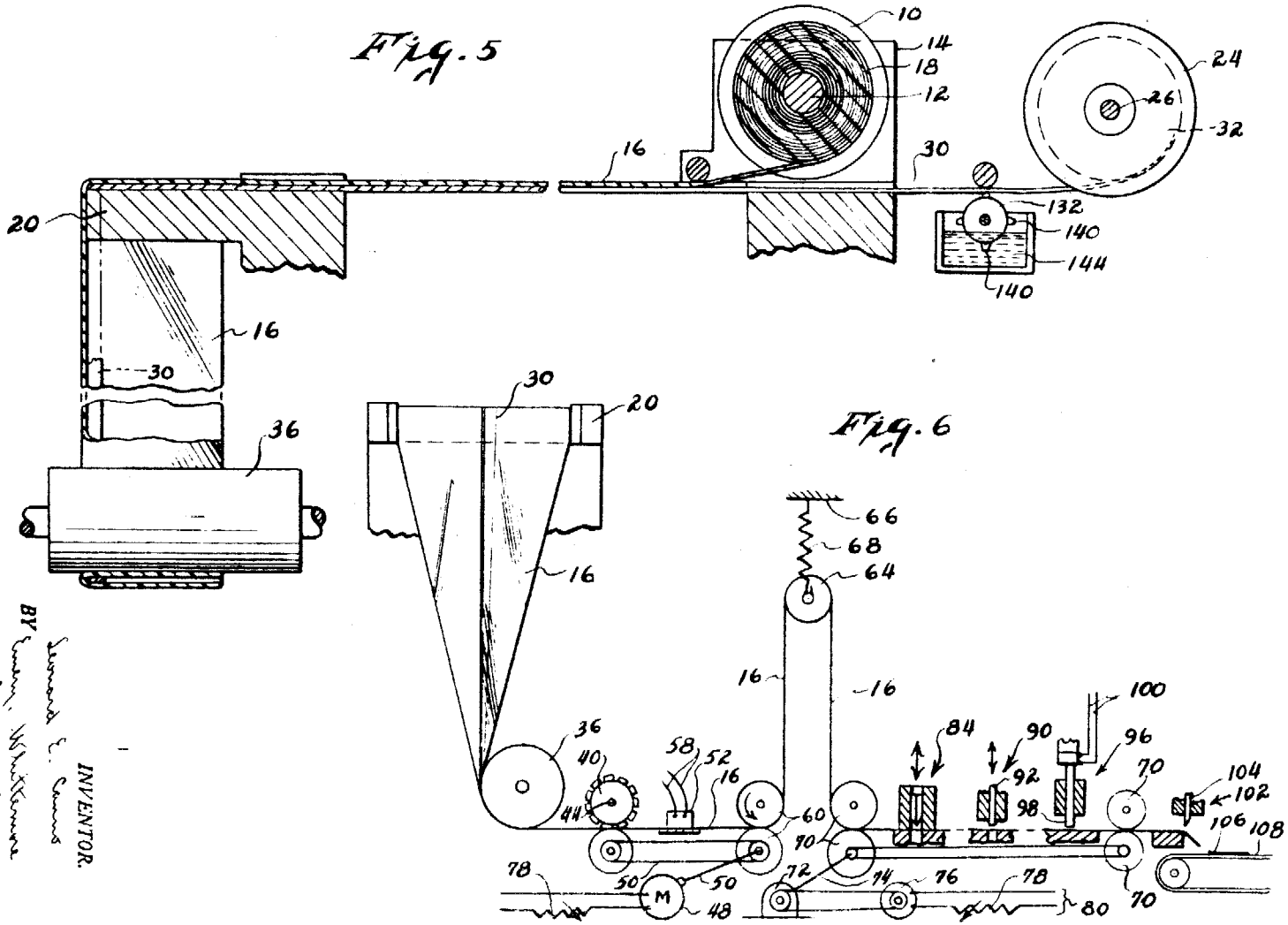
INVENTOR.
Leonard E. Canno
BY Emery, Whittemore
Hunter & Graham
ATTORNEYS United States Patent Office Re. 26,075
Reissued Sept. 6, 1966

26,075
METHOD OF MAKING REINFORCED PLASTIC BAGS

Leonard E. Canno, New York, N.Y., assignor to Equitable Paper Bag Co., Inc., Long Island City, N.Y., a corporation of New York Original No. 2,971,874, dated Feb. 14, 1961, Ser. No. 14,933, Mar. 14, 1960. Application for reissue July 2, 1962, Ser. No. 207,483
12 Claims. (Cl. 156—202)

**Matter enclosed in heavy brackets [ ] appears in the original patent but forms no part of this reissue specification; *matter printed in italics indicates the additions* made by reissue.**

This invention relates to the manufacture of plastic bags and more especially bags that have a reinforcing strip at the upper end of the bag above a zone along which the bag is sealed.

Plastic bags, and particularly polyethylene bags, are used as low-cost containers, and any improvements in construction to reinforce the bag or to provide better panel space for information and advertising, must be inexpensive in order to be useful in commercial packaging.

It is an object of this invention to provide a method for making an improved plastic bag in which the plastic sheet material is folded at the top of the bag and extended downwardly to form the front and back panels of the bag. The method introduces a stiffener into the fold during the making of the bag, and this stiffener extends down close to the zone at which the front and back panels are sealed together to close the upper end of the portion of the bag that contains the merchandise.

The invention provides a combination of steps in which the reinforcing stiffener is introduced into the fold of the bag, and punching and sealing operations are performed at times which tend not to reduce the speed of manufacture and in which the additional operations are performed simultaneously with others that are necessary in the manufacture of conventional bags of the type to which this invention relates.

Other objects, features and advantages of the invention will appear or be pointed out as the description proceeds.

In the drawing, forming a part hereof, in which like reference characters indicate corresponding parts in all the views.

Figures 1, 2, 3, 4:
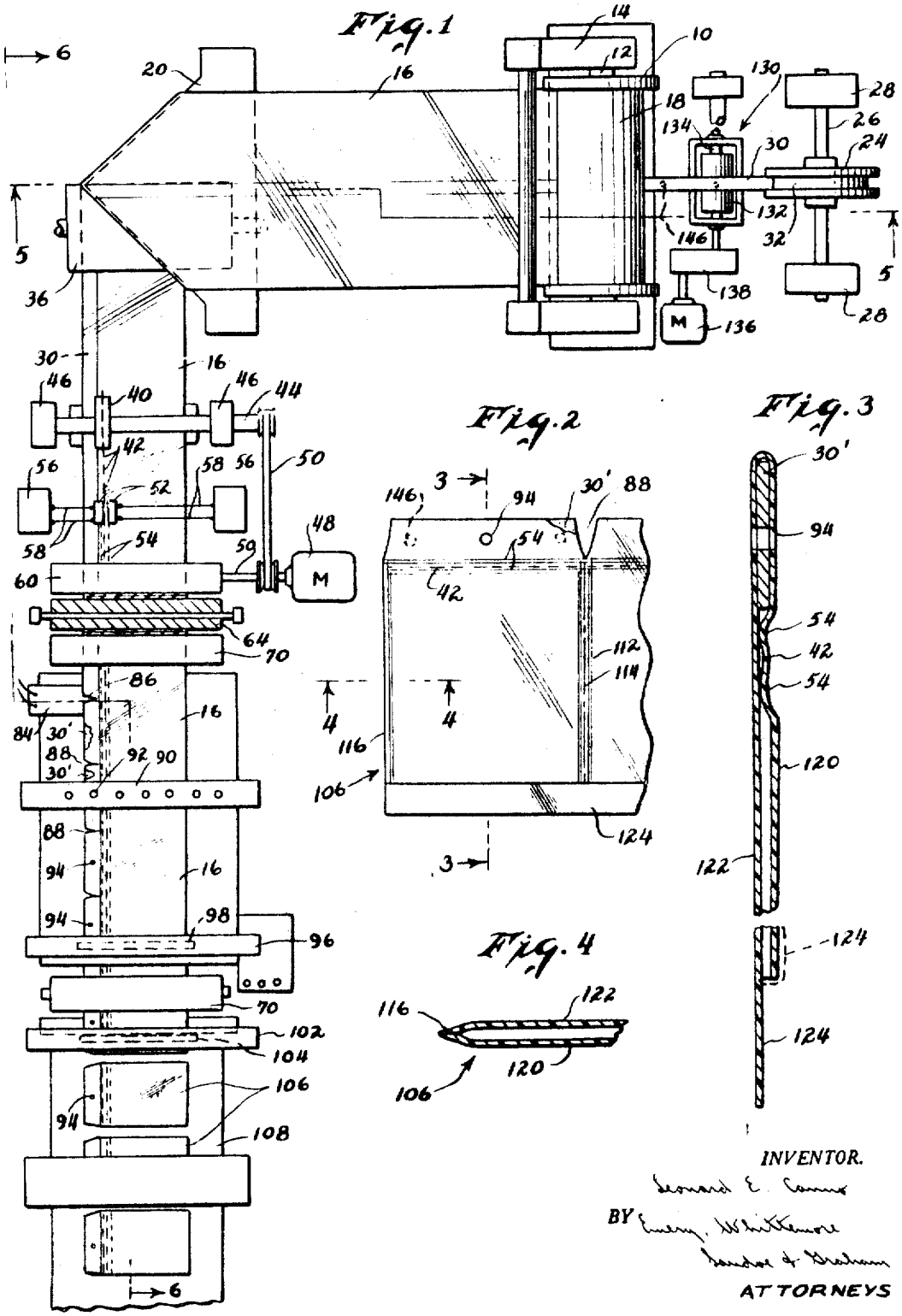
FIGURE 1 is a diagrammatic top plan view of apparatus for making plastic bags in accordance with this invention.
FIGURE 2 is an enlarged view showing one of the plastic bags made by the method disclosed in FIGURE 1.

FIGURES 3 and 4 are greatly enlarged, fragmentary, sectional views taken on the lines 3—3 and 4—4, respectively, of FIGURE 2;

FIGURE 5 is an enlarged sectional view taken on the line 5—5 of FIGURE 1; and

FIGURE 6 is a fragmentary, diagrammatic view taken along the line 6—6 of FIGURE 1.

FIGURE 1 shows a spool 10 supported by an axle 12 from bearings in a frame 14. A web 16 of plastic sheet, preferably polyethylene, is wrapped in a reel 18 on the spool 10. The web 16 is unwound from the reel 18 and advanced, toward the right in FIGURE 1, to a folder guide 20 at which the web is folded along a longitudinal line offset slightly from the center of the web.

Another spool 24 is supported by an axle 26 from bearings 28. A strip of stiffener material 30, such as cardboard, is wrapped in a reel 32 on the spool 24.

This strip of stiffener 30 is withdrawn from the spool 24 and is advanced to the folder guide 20 immediately under the web 16.

The web 16 is folded with one edge of the stiffener 30 along the inside of the fold, and with the web 16 and stiffener 30 in this relation, they pass around a guide roll 36 and advance horizontally to a series of work stations.

Some variation in the subsequent operations is permissible, but in the preferred operation of the invention, the folded web 16 is first subjected to the operation of a perforating die 40 which leaves a row of spaced incisions 42 through both layers of the folded web 16 and spaced a short distance beyond the edge of the stiffener 30. This perforating die 40 is preferably a rotary cutter secured to a shaft 44 which rotates in bearings 46 and which is driven from a motor 48 by motion-transmitting connections 50.

Beyond the operating station to which the perforating die 40 is located, the folded web 16 passes under two sealers 52 which preferably apply heat to the top surface of the plastic web with sufficient intensity to heat-seal the top layer of the plastic to the underlying layer along two narrow zones 54 on opposite sides of the incised line 42, and with both of these sealed zones 54 beyond the edge of the stiffener 30.

The sealers 52 are held in contact with the plastic web 16 by any conventional means and they are preferably heated electrically by current supplied from transformers 56 through conductors 58.

After passing beyond the station at which the sealed zones 54 are formed, the folded plastic web 16 passes through a loop accumulator, best shown in FIGURE 6. The web 16 is advanced by continuously-operating feed rolls 60 driven from the motor 48 through motion transmitting connections 50.

Beyond the continuously-operating feed rolls 60, the folded web 16 passes upwardly around a slack accumulator roller 64, supported from a fixed structure 66 by yieldable supporting means 68. The web 16 passes around the loop accumulator roller 64 and downwardly to intermittently-operated feed rolls 70 driven from a transmission 72 by a motion-transmitting connection 74. Power is supplied to the transmission 72 from a motor 76 supplied with electric current through speed control means 78 in a power line 80.

The transmission 72 operates the feed rolls 70 with intermittent motion correlated with the operation of tools at other operating stations. Such correlation with step-by-step movement of a work piece is well understood in the art and no further illustration of apparatus is necessary for a complete understanding of this invention.

The yieldable support 68 maintains a constant tension on the loop formed by passage of the web 16 around the roller 64 and this results in an upward movement of the roller 64 when the feed rolls 70 are stationary, and a downward movement of the roller 64 when the feed rolls 70 are in operation. The amount of web fed by the intermittently-operating feed rolls 70 must be equal to that fed by the continuously-operating feed rolls 60 over a period of time.

Beyond the slack accumulator, the folded web 16 passes a cutter 84 having a blade 86 (FIGURE 1) which cuts notches 88 through the fold of the web and for a distance substantially equal to the width of the stiffener 30. Thus the notches 88 extend close to the nearer sealed zone 54, and preferably somewhat beyond the stiffener 30. This operation severs the stiffener strip so that there are separate stiffeners 30' between successive notches 88. In the preferred operation, the edges of the notches 88 are preferably made with a slight degree of concave curvature, as shown in FIGURE 2.

Beyond the cutter 84, the folded web passes to a punching station 90 at which a punch 92 makes a hole 94 through the folded web and the stiffener at a location midway between successive notches 88. This hole 94 may be a small one for the purpose of hanging the bags on hooks, or with larger bags it may be of sufficient size to receive the fingers of a person carrying the bag. Where such provision is to be made for carrying the bag, two or more holes 94 may be punched between successive notches 88.

The next operation on the folded web is a sealing of the layers of plastic along zones extending transversely of the web. This is performed at a sealing station 96 by a hot blade 98 (FIGURE 6) which comes in contact with the top surface of the folded web across the entire transverse width of the web. When the invention is carried out without cutting notches 88 in the folded web, the blade 98 may extend across the full width of the web, though it can not seal the overlying layers of plastic together where the stiffener 30 is located between them adjacent to the fold. In the construction illustrated, the blade 98 may terminate at the ends of the notches 88, or it may extend across the notches. The blade 98 is preferably heated by electricity supplied from a power line 100. One step beyond the sealing station 96, the folded web 16 is cut at a shearing station 102 having a blade 104 which cuts the folded web to form separate bags 106 (FIGURE 1). These bags are separated from the folded web, as fast as they are cut, by friction on a conveyor 108, best shown in FIGURE 6.

The blade 98 heat-seals the plastic along a zone 112 (FIGURE 2) which is of substantial width, and the bags are cut apart along a shear line 114 midway across the heat-sealed zone 112. This leaves each bag 106 with a heat-sealed edge region 116, shown in FIGURE 4.

As explained in connection with the original folding of the plastic web 16, the fold is not made at the center of the web and this leaves each bag with a front panel 120 formed by the top layer of the fold, and a rear panel 122 formed by the lower layer of the folded web, and with the rear panel 122 extending beyond the front panel 120 to leave a flap 124 for closing the bag after the bag has been filled with merchandise. FIGURE 3 shows the flap 124, in dotted lines, in its folded condition.

Various expedients can be used, if desired, for preventing end-wise movement of the stiffener 30' in the upper folded end of the finished bag. One such expedient is illustrated in FIGURES 1 and 5. An applicator 130 is located between the spool 10 and the spool 24. This applicator contains a roller 132 which is secured to an axle 134 driven by a motor 136 through motion-transmitting connections 138.

The roller 132 has projections 140 at angularly-spaced regions around its circumference. The stiffener strip 30 passes across the roller 132 and the projections 140 contact with the stiffener strip 30 at spaced locations along its length as the strip moves longitudinally across the rotating roller 132.

The lower part of the roller 132 dips into a well of adhesive 144, and this adhesive is applied to the bottom of the stiffener strip 30 by contact of the projections 140 with the advancing strip. This produces spots 146 (FIGURES 1 and 2) of adhesive along the stiffener strip 30; and this adhesive is of a nature which sticks to the inner face of the polyethylene web which confronts the spots 146 in the finished bag. Many other expedients for preventing end-wise movement of the stiffener 30' in the finished bag can be used. The roller 140 can be used to punch holes instead of applying adhesive; and the plastic material areas confronting one another through the holes can be heat sealed to one another.

The preferred embodiment of the invention has been illustrated and described, but changes and modifications can be made, and some features can be used in different combinations without departing from the invention as defined in the claims.

What is claimed is:

1. The method of making plastic bags, each of which has a top compartment sealed off from the remainder of the bag and with a reinforcing strip enclosed in the sealed-off compartment, which method comprises advancing a web of plastic film from a supply source and simultaneously advancing a continuous length of the reinforcing strip with the film web, folding the web of plastic film with the strip within the fold, sealing confronting faces of the web to one another immediately below the strip to form, within the fold, a compartment enclosing the strip and extending lengthwise of the strip, also sealing the confronting faces of the web together at regions spaced from one another lengthwise of the length of the web and strip and with said regions extending transversely of the folded web, and severing the web at said regions across the full width of the web and through the strip to form separate bags.

2. The method of making plastic bags as described in claim 1 and in which holes are punched through the folded film and strip at regions spaced along the length of the strip and at a location that is substantially midway between the parts of the web and strip that are severed to make the separate bags.

3. The method of making plastic bags as described in claim 1 and in which the confronting faces of the web are sealed together transversely of the folded web by applying heat to the web across the full width thereof including a portion of the web where the strip is between the confronting faces of the web, said strip serving as a spacer to prevent the plastic from sealing at the end of the compartment.

4. The method of making plastic bags as described in claim 1 and in which sections of the folded plastic and the strip are severed from the remainder of the web and strip at regions along the length of the web spaced by the width of the separate bags, each severed section extending from the folded edge to the inner edge of the strip at the region of the lengthwise extending seal, and each of said severed sections being at a location at the end of the regions that are sealed transversely of the folded web.

5. The method of making plastic bags as described in claim 1 and in which the strip is treated as spaced regions along its length, prior to the folding of the plastic over the strip, to make bonding areas where the strip is held against end-wise movement with respect to the compartment in the finished bag.

6. The method of making plastic bags as described in claim 5 and in which the treatment of the strip constitutes a spotting of at least one side of the strip with an adhesive that bonds to the plastic material of the web.

7. The method of making plastic bags as described in claim 1 and in which the method includes punching holes in the strip before it is enclosed in the fold of the web, and anchoring the strip against end-wise movement in the finished bag by bonding together the faces of the web that confront one another through the hole punched in the strip before the strip is enclosed in the web.

*8. The method of making plastic bags as described in claim 1, and in which the severing of the web is performed in two steps and at different and longitudinally spaced stations along the length of the web, the folded web and strip being notched by cutting through them across the transverse width of the folded web for a distance extending from the fold to at least the edge of the strip remote from the fold as the first step of the severing operation, and the notches being cut before said spaced sealing together of the confronting faces of the web, and the web and strip are advanced beyond the region of the notching with a step-by-step movement, the sealing together of the confronting faces and the second step of severing being performed beyond the notching station, and the severing of said second step being across the transverse width of the web beyond each notch and in substantial alignment therewith.*

*9. The method of making plastic bags which comprises advancing a web of plastic film from a supply source and*

*simultaneously advancing a continuous length of reinforcing strip with the film web, folding the web of plastic and continuously feeding the reinforcing strip into the fold, securing the strip in the space between confronting faces of the web and with one edge of the strip immediately adjacent to the fold, sealing the confronting faces of the folded web to one another longitudinally of the web and adjacent to and beyond the edge of the strip that is remote from the fold, simultaneously making cuts through the plastic film and the reinforcing strip across the width of said strip at a cutting station and at locations spaced from one another lengthwise of the web and strip to form bag blanks of a width substantially equal to the intended width of the plastic bags, heat sealing the confronting portions of the plastic web for the transverse width of the web from the region of the strip to form transversely sealed areas dividing the web into individual bag compartments, and severing the bag blanks from one another intermediate the limits of the transversely sealed areas, and across the remaining width of the web, the severing being performed by different means from that used to make the cuts through the strip.*

*10. The method of making plastic bags as described in claim 9 and characterized by the strip being secured in the space in the fold of the web by sealing areas of the confronting faces of the strip and web to one another.*

*11. The method of making plastic bags as described in claim 9, and in which the cuts are made through the*

*folded web and strip before heat sealing the spaced confronting portions of the web, and then advancing the web and strip further and severing each bag blank from the other at a different station and at a later time in the process from the cutting of the strip.*

*12. The method of making plastic bags as described in claim 9, and in which notches are cut in the folded web and strip at said cutting station, and said notches are cut before the confronting faces of the web are transversely sealed beyond the notches, and both the sealing transversely across the web and the severing of individual bags from one another are performed after the web and strip have advanced beyond the notch cutting station and by different means from those used to cut the notches.*

References Cited by the Examiner

The following references, cited by the Examiner, are of record in the patented file of this patent or the original patent.

UNITED STATES PATENTS

| | | | |
|---|---|---|---|
| 2,347,439 | 4/1944 | Shea et al. | |
| 2,798,523 | 7/1957 | Barrett | 156—202 X |
| 2,878,849 | 3/1959 | Lingenfelter et al. | 156—202 |
| 2,953,976 | 9/1960 | Hahn. | |

EARL M. BERGERT, *Primary Examiner.*

P. DIER, *Assistant Examiner.*